United States Patent
Luciano, Jr.

(10) Patent No.: US 7,137,889 B1
(45) Date of Patent: Nov. 21, 2006

(54) SYSTEM AND METHOD FOR USING TIME-SENSITIVE TICKETS AS PLAYER AWARDS IN GAMING MACHINES

(75) Inventor: Robert A. Luciano, Jr., Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 623 days.

(21) Appl. No.: 10/391,295

(22) Filed: Mar. 17, 2003

Related U.S. Application Data (60) Provisional application No. 60/366,026, filed on Mar. 19, 2002.

(51) Int. Cl.
*A63F 9/24* (2006.01)

(52) U.S. Cl. ............... 463/25; 463/42; 705/14; 705/17; 705/5; 235/375; 235/381

(58) Field of Classification Search ............... 463/1, 463/9–13, 16–20, 25–27, 40–42; 235/375, 235/381; 705/14, 17; 283/51, 53, 903
See application file for complete search history.

(56) References Cited

U.S. PATENT DOCUMENTS

| | | | | |
|---|---|---|---|---|
| 4,953,895 A | * | 9/1990 | Goussios | 283/102 |
| 5,823,874 A | * | 10/1998 | Adams | 463/17 |
| 5,983,196 A | * | 11/1999 | Wendkos | 705/14 |
| 6,049,778 A | * | 4/2000 | Walker et al. | 705/14 |
| 6,061,660 A | * | 5/2000 | Eggleston et al. | 705/14 |
| 6,609,970 B1 | * | 8/2003 | Luciano, Jr. | 463/16 |
| 6,875,107 B1 | * | 4/2005 | Luciano, Jr. | 463/25 |

* cited by examiner

*Primary Examiner*—Mark Sager
(74) *Attorney, Agent, or Firm*—Brown Raysman Millstein Felder & Steiner LLP (57) ABSTRACT

A new system and method for use in dynamic gaming environments such as Nevada-style casinos and Amerindian casinos is presented that enables using time-sensitive tickets as prizes. Block of tickets for a future event are allocated to a casino, which constitutes a "found" market (the ticket seller expends no funds for the tickets sold to the casino). This block may also be sold through normal reseller channels; the allocated block acts as a cap to the number of tickets potentially channeled through a casino rather than being a casino exclusive. This enables the casino to purchase the tickets at a steeper discount rates than is otherwise possible, and by associating tickets with payout events on games or progressives (instead of cash awards), enables time-sensitive tickets to be awarded as prizes on an on-going basis.

17 Claims, 5 Drawing Sheets

Figure 1
Infrastructure According
To The Present Invention

FIGURE 2
Method For Enhancing Game Attractiveness Using Dynamic Displays With Travel Awards In A Gaming Environment Figure 3
Gaming Machine With Prize Display(s) In/On Top Box Area FIGURE 5
Methods For Using Time-Sensitive Tickets In A Gaming Environment With Frequent Win Events

SYSTEM AND METHOD FOR USING TIME-SENSITIVE TICKETS AS PLAYER AWARDS IN GAMING MACHINES

RELATED APPLICATIONS

This application claims the benefit of provisional application 60/366,026 filed on Mar. 19, 2002 entitled "System And Method For Using Time-Sensitive Tickets As Player Awards In Gaming Machines".

BACKGROUND OF THE INVENTION

1. Field of the Invention

This invention pertains generally to gaming machines. More particularly, the present invention discloses a method and apparatus for providing gaming machines with time-sensitive awards in a dynamic manner, enabling tickets to be purchased by the casino only when a ticket is actually won by a player.

2. The Prior Art

Traditional Las Vegas style slot machines are generally well known. In particular, the slot machines have a display area visible to a player that allows viewing of either physical slot reels, reel strips, or video displays showing pseudo-reels. The reels either spin or appear to spin, stopping with various game indicia visible to the user through a viewing area or display.

In addition to the primary game, an increasing number of games have a bonus game or secondary game. Typical of this type of game is "Wheel Of Fortune"®, which upon a winning event in the primary game, lets a player hit a button that spins a wheel. When the wheel stops, and the player's bonus is increased by an amount indicated by the pointer or wheel indicator.

Other games play in an essentially similar way. A player plays the primary game until a triggering event occurs (i.e., certain symbols show up on the paylines of the reels, etc.). The game then enters a bonus or secondary game, where in some manner additional points (game credits) are awarded. This may be the spin of a wheel, an animated sequence where the player is made to believe they have input by pushing a button or touching the screen during the animation, or some type of fixed display sequence which results in an additional bonus. In all cases, some amount of additional game play points are awarded to the player. That completes the bonus or secondary game play.

The other common way in which players can win something more than a traditional jackpot is to play on a machine that is part of a progressive. Upon the occurrence of a winning event, in addition to any jackpot won on the local machine, a player also wins an amount shown on the progressive jackpot meter. The progressive jackpot meter is typically a single display above a bank of machines, showing the amount of money a player could win if they play on a machine in that bank, and hit the progressive jackpot.

These types of gaming machine enhancements are very limited, involving the win of additional game credits or a progressive jackpot. There is a need to provide additional player excitement upon the occurrence of a winning event, but in a manner that enables casinos to properly manage the award costs and the cash flow associated with any given prize or award.

BRIEF DESCRIPTION OF THE INVENTION

The present invention is a method and system that allows gaming establishments to use time-sensitive tickets ("time-sensitive" includes but is not limited to tickets for events including sports events, travel packages, concerts, reservations at specified restaurants, etc.). In the past it has been much too difficult to use tickets which have a relatively short life-span for prizes associated with game play in a gaming environment. The system of the present invention, however, allows the use of tickets with very limited life-span to be used as prizes in a gaming establishment. "Gaming establishment" includes traditional Nevada-style casinos, Amerindian casinos, bingo halls, and any other place where players win or lose money based on games whose outcomes are fully or partially determined by purely random events.

This is accomplished by provided real-time, on-line access from a gaming establishment to a ticket database on a computer at a ticket seller's establishment. It is preferable that the ticket database be the primary source of the tickets (airline's reservations database, promoter's database, travel package tickets from the originator of the entire package, etc.) but may be indirect, such as from a travel agency.

In addition to the on-line access, the present method involves a low- to no-risk allocation of tickets to the gaming establishment, coupled with additional discounts to the gaming establishment to make the tickets look better to the players who win them. This is accomplished by allocating a block of tickets for the gaming establishment ("casino" for short, but is understood to include bingo halls and the like as well as traditional casinos), as ticket awarding events occur at the casino. However, the block is not allocated exclusively to the casino; it is simply the maximum number of tickets that may be purchased and then awarded to players for that ticket event by the casino. The tickets in that block may also be sold by the airlines, promoter, etc. This allows the casino to arrange a below-normal discount (steeper discount rate) for those tickets than the average reseller gets. If the tickets are "hot" and the tickets are all or mostly sold through normal, higher-margin resellers; in such a case the promoters, airlines, etc., will sell all or most of the tickets at the normal rate. The casino may award a few as time goes on, but will not use many if the event sells out quickly. This limits the down-side for the organization selling the extra discount tickets to the casinos. On the other hand if the event is undersold, the extra sales made through the casinos are all welcomed to reduce losses or make minimal margins (are "found sales" or "free sales", as ordinarily there would be no sales through the casinos, and no marketing money has been spent to reach that channel).

A value is assigned by the casino for each ticket, preferably being more than what the casino paid but less than full retail, enabling an apparent higher payback to be given to players (from the player's perspective). That assigned value is then used to associate the tickets with game events having the same value (equivalent cash value). Instead of giving cash for this game event when it occurs, once the association is made the casino will award a ticket instead. This association is preferably made in software, using pointers to go from certain entries in a payout table to the issuance of a ticket rather than a cash award being dispensed. When the tickets are no longer available (for any reason), the tickets are dis-associated from the payout table and revert to equivalent cash awards.

In addition to being awarded for a specific game event on a specific game, the tickets may also be awarded upon the occurrence of player loyalty events (how much the player is at the casino, how much they spend, etc.). In this case, the tickets would be paid from casino promotional money rather than as a percentage of player's wagers. Tickets may further be used with progressive pools, forming part or all of the prize when a game hits.

Note that although the allocated pool may be sold by two or more entities, an agreement between the ticket sellers and the casino does not have to be made on such an arrangement. Alternate arrangements are possible while still enabling a casino to be treated to steeper discounts, or, in some cases, a casino may simply be willing to pay the normal going rate for particularly popular events (i.e., baseball world series tickets). All such variations are considered herein.

Further, there is an additional way of using the present invention when there will be a predictable series of tickets available for related events over an extended time period (a sports season, a concert season, etc.). A block of tickets will be allocated to the casino on a rolling time basis. As one event is either sold out or the time has come for the event, there will be another allocated block of tickets for the next event in the season; when that one is sold out of past, then the tickets being sold are from the next event, and so on. This also works extremely well for multiple events, allowing multiple allocated blocks of tickets for different events being available at the same time. Players can then choose what they like, rather than having to accept a single type of ticket (i.e., a sports event vs. a symphony orchestra concert vs. reservations at a desirable restaurant).

DESCRIPTION OF THE INVENTION

Persons of ordinary skill in the art and with the benefit of the present disclosure will realize that the following description of the present invention is illustrative only, and is not limiting. Other embodiments of the invention will readily suggest themselves when such skilled persons have the benefit of the present disclosure.

Referring to the drawings, for illustrative purposes the present invention is shown embodied in FIGS. 1 through 5. It will be appreciated that the apparatus may vary as to configuration and as to details of the parts without departing from the inventive concepts disclosed herein. The methods may vary as to details, partitioning, repetition, actions varied and the order of the acts, without departing from the inventive concepts disclosed herein.

Figure 1:
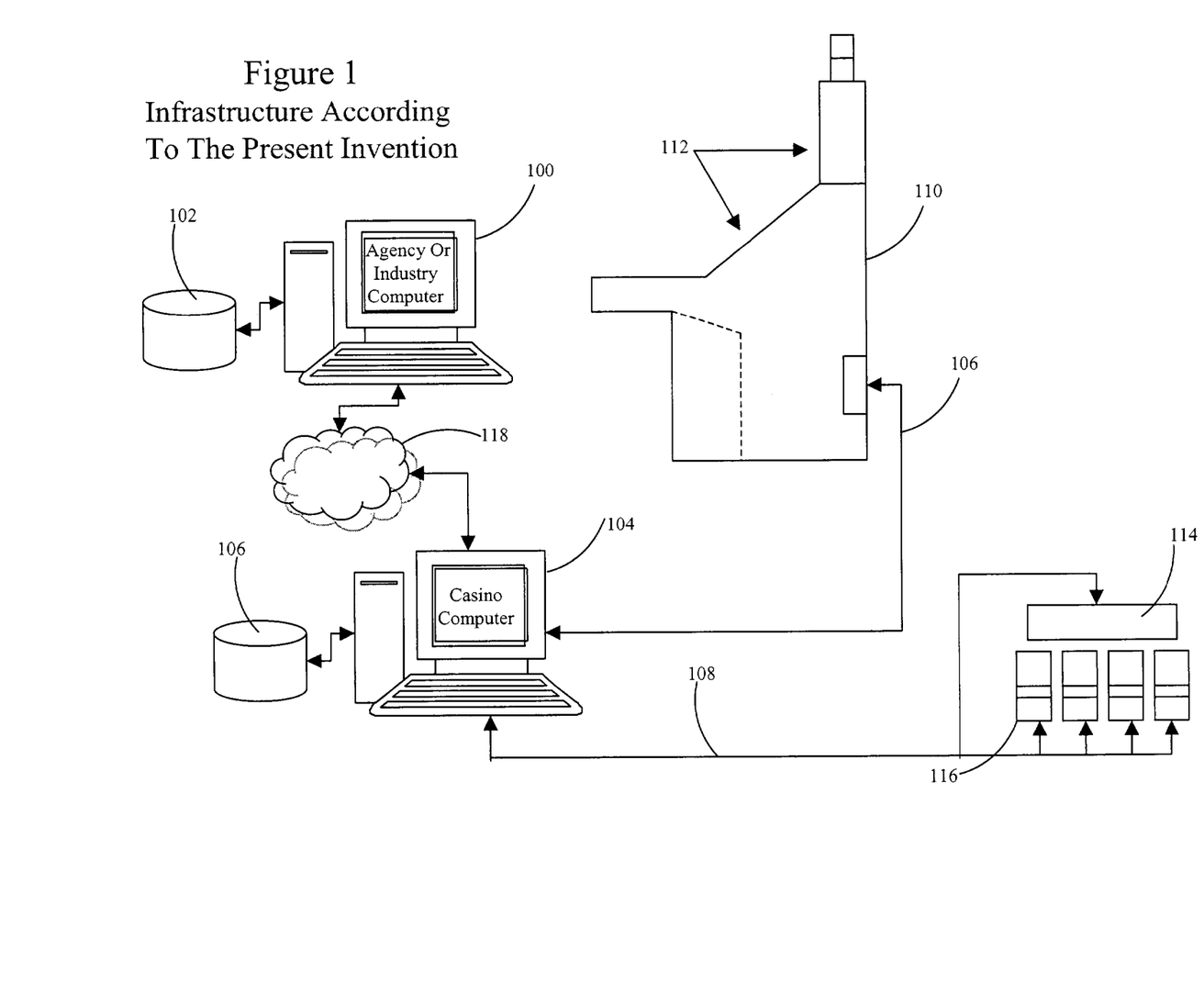
FIG. 1 shows a system and infrastructure according to the present invention.

FIG. 1 shows an example embodiment of a system according to the present invention. There must be at least one travel industry computer 100 having a tickets or reservations database on storage 102 that is on-line to computer 100 (i.e., an on-line reservations or ticket sales system). Computer 100 is accessible by a casino computer 104 (typically a back-end machine not on the casino floor) which will typically have its own a storage and database 106. The connection must be a real-time connection, shown as Internet cloud connection 118. It may be any type of wide area connection, or even a local area connection if the travel industry on-line system is in close proximity to the casino back-end system.

"Real-time" means that as tickets and/or travel packages are sold, or for any reason become unavailable for use by a casino as recorded by the travel agency's or travel industry's reservations database, the casino's computer can be informed within a very short amount of time (typically in less than a minute, preferably within a few seconds). There are several ways of achieving this using WAN/LAN technology, including the use of a web page interface on the reservations database computer by a casino. Any such network based enabling configuration is contemplated by the present invention. Each installation will decide which connectivity means best suits its needs and existing network infrastructure.

Casino computer 104 keeps its data about the availability of travel packages that may be won by a patron updated, as explained above. Casino computer 104 then uses the information to create more attractive winnings for players, communicating with internal (to the casino, or set of casinos) displays (114) or individual gaming machines (110).

The communications links between a Casinos' back-end computer and displays associated with banks of machines and/or individual gaming machines is known, and may include an Ethernet backbone connection to floor controllers, with the floor controllers connected to individual gaming machines using serial interfaces. Alternatively, the back-end computers may be linked to both individual gaming machines (alternatively just visual displays thereon) and displays associated with banks of machines. Other configurations may be used as well; any such operable networked connection is contemplated by the present invention. FIG. 1 shows the casino's network connections generally as connections 106 and 108, which are understood to include any operable network connection between a casino's back-end computer system and individual gaming machines, banks of machines (for progressive-type travel awards), and displays associated with banks of gaming machines or standalone displays used for promotional purposes.

For systems having displays on individual gaming machines, display locations may be in any place visible to the user to be operable with the present invention. Gaming machine 110 could have small LCD displays on any surface pointed to by 112 and perform the needed functions of the present invention. Gaming machines could also use a portion of a larger video display typically on the slanted surface of gaming machine 110 (a "screen within a screen"), or may have a smaller, separate video display near the primary display. All such display variations are contemplated by the present invention. The important functions any such display must have is to be visible to a player using the machine, and to be able to be updated on an ongoing basis by responding to signals sent by casino computer 104, using the networked connection 106.

For cases where the travel awards or other time-sensitive tickets are to be won based on a progressive-style event, meaning more than one gaming machine is contributing to the cost of a travel award and/or more than one gaming machine may allow a player to win the same award, then a preferred embodiment will use casino computer 104 and network connection 108 to communicate with display 114 (also connected to a bank of gaming machines 116). A description of the travel award, its retail value, and the number of travel awards available will be displayed in a "player attract mode". Note that this connectivity allows gaming machines 116 to participate in both a progressive-style travel award win, and have travel awards winnable on only specific individual gaming machines. This may be desirable when two price levels of travel awards are being promoted by a casino at the same time. A relatively inexpensive travel award (i.e., a weekend in Hawaii) may be won on certain individual gaming machines, while more expensive travel packages (i.e., a month on the French Riviera, with 2-day stops in various other cities) are available as a progressive-style win.

Figure 2:
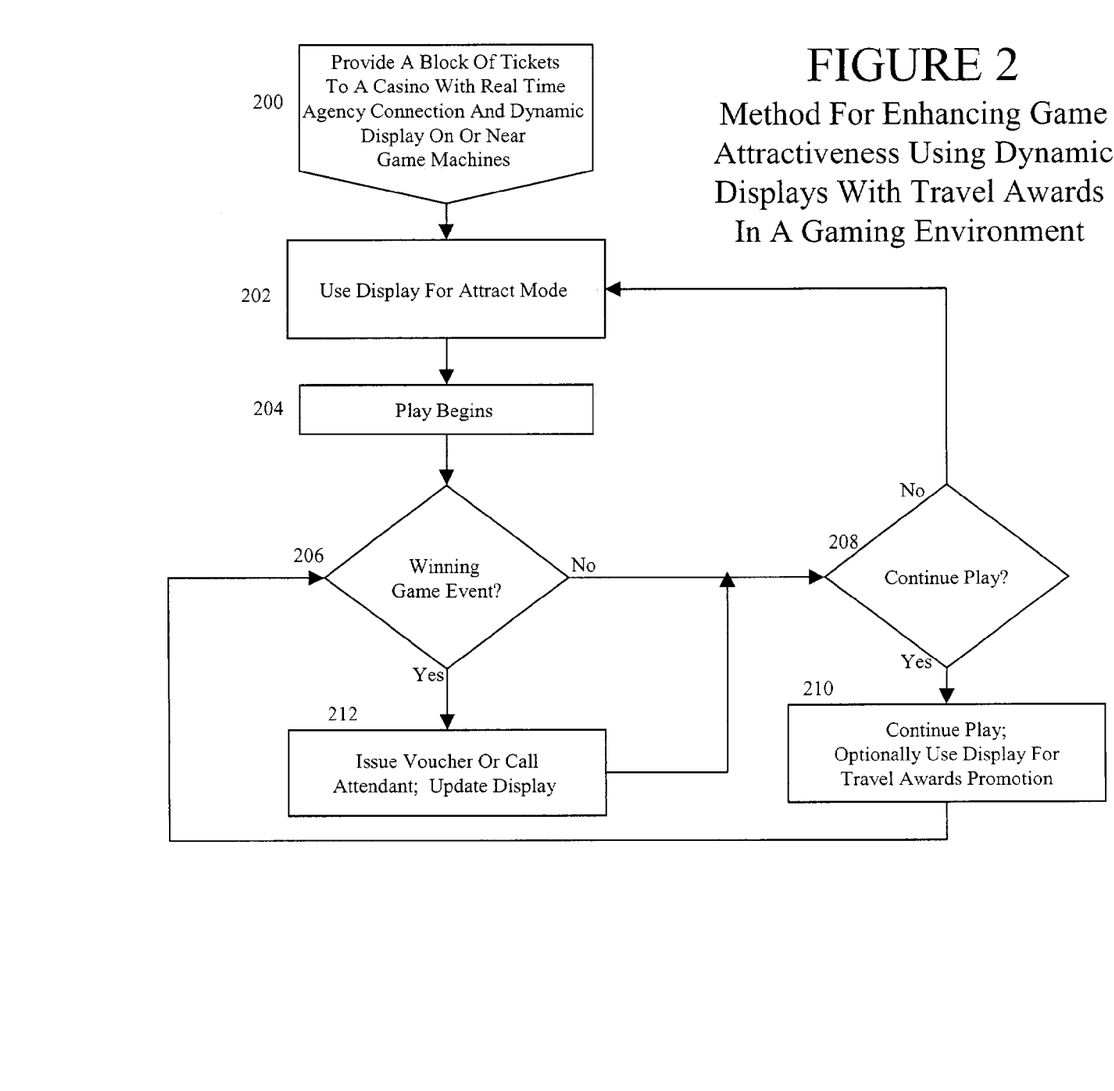
FIG. 2 is a flow diagram showing a method of using time-sensitive awards to enhance game attractiveness according to the present invention.

FIG. 2 illustrates a method using blocks of dynamically allocable tickets from a travel agency or a member of the travel industry (i.e., an airline's reservations database directly, rather than through an agent), the casino's backend computer system, and dynamically addressable displays visible to players on the casino floor to create enhanced player interest in gaming through more attractive awards.

Box 200 is the starting point, where the actions corresponding to this box include providing a casino with a block of travel tickets (or a sporting event or other time-sensitive tickets). This block of tickets will typically have a reduced wholesale price negotiated between the agency or provider of the event or travel package. In a preferred embodiment, the casino will not pay for the tickets up front. Rather, a block of tickets is provided that may be used by both parties. Preferably, the agency or service provider will use non-allocated tickets first, then, on an as needed basis as the event or travel package shows signs of selling out using normal distribution channels, the block of tickets allocated to the casino will be sold. Because the casino has an operable real-time connection (as explained above) with the agency's or provider's database, as tickets are removed from availability to the casino, the casino's computer will update itself and make the current availability known to players. Note that this is a great way to create excitement amongst players—if they want this travel package, they must play to win the triggering event on an eligible gaming machine. If a player wins a ticket during game play, the casino indicates that a ticket from its pool is now purchased, and not available to either other players in the casino nor available to sell through the agency's or provider's normal ticket distribution means. Payment between the casino and the agency/provider is as previously arranged between the two; typically it will be fairly immediate through an on-line transfer but may simply be invoiced by the agency/provider, after the casino indicates it has reserved a ticket from its block, on a timely basis to the casino.

Continuing into block 202, the displays on or near gaming machines will be updated by a casino computer with (as the casino sees fit); descriptions of the time-sensitive item (travel package, event ticket); retail value; and, number of such prizes currently available (note: the internal prize level of the ticket will typically be less than the retail value, although that is not required). Depending on the display capabilities, attract modes may further include digitized pictures depicting the package or event. Box 202 is left and box 204 entered.

The actions corresponding to box 204 include a player enabling the game for play. This may be the presentation of a voucher to a player I/O device, cash input to the gaming machine, EFT transfer, or any other means of establishing game play credits on the gaming machine. After game play starts in box 204, diamond 206 is entered.

The decision corresponding to diamond 206 is to determine if a game winning event has occurred after a game play. This could be any game winning event as defined by the game itself, or, if a progressive-style award is available, the occurrence of a progressive winning event (which may or may not depend on the gaming results of the individual gaming machine). If there is a winning event, diamond 206 is left via the "YES" exit to box 212.

The actions corresponding to box 212 includes enhanced player recognition by using the display in communication with the casino's backend computer, update of the number of tickets remaining after this win (both on the player-visible display and with the providing agency's reservations database), and the printing of a redeemable voucher or ticket, or an attendant call (the attendant will do any needed paperwork to deliver a ticket, possibly including filling out a W4G). Box 212 is left for diamond 208.

The decision corresponding to diamond 208 is if the player is continuing to play or is leaving the game. If the player decides to leave the game, the "NO" exit is taken from diamond 208 and box 202 is re-entered, continuing the process with the actions corresponding to that box.

If the player wishes to continue to play, the "YES" exit is taken to box 210. The actions corresponding to box 210 include the player continuing play by invoking a next game event, and, optionally, using one or more dynamic displays in a continuing player attract mode. As soon as a player has triggered a next game event, box 210 is left and diamond 206 is re-entered.

Returning to diamond 206 from above, if the game event had no winning event then the "NO" exit is taken to diamond 208. The actions corresponding to diamond 208 are explained immediately above; the player decides to keep playing or not.

Figure 3:
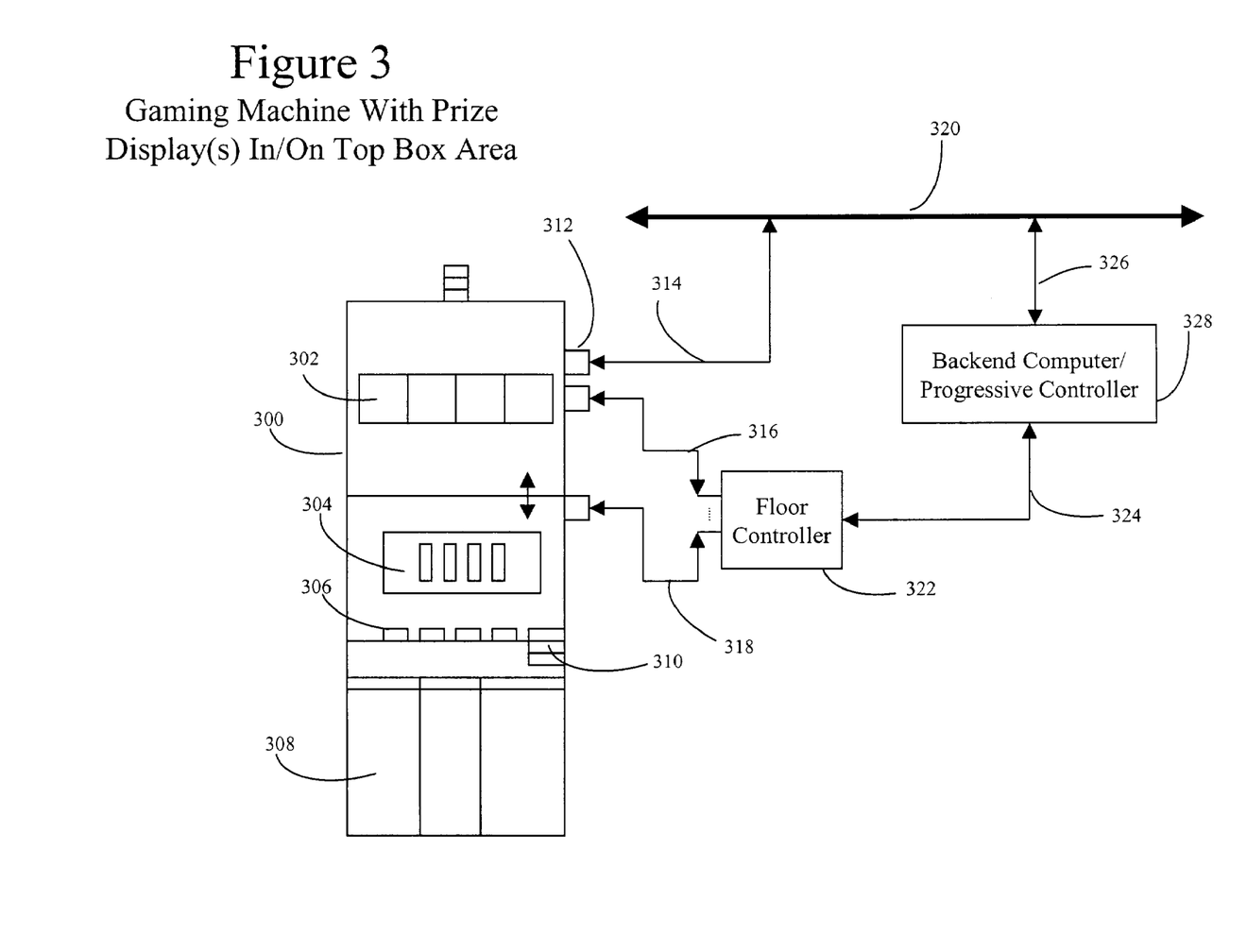
FIG. 3 shows a gaming system for use with the present invention.
Figure 4:
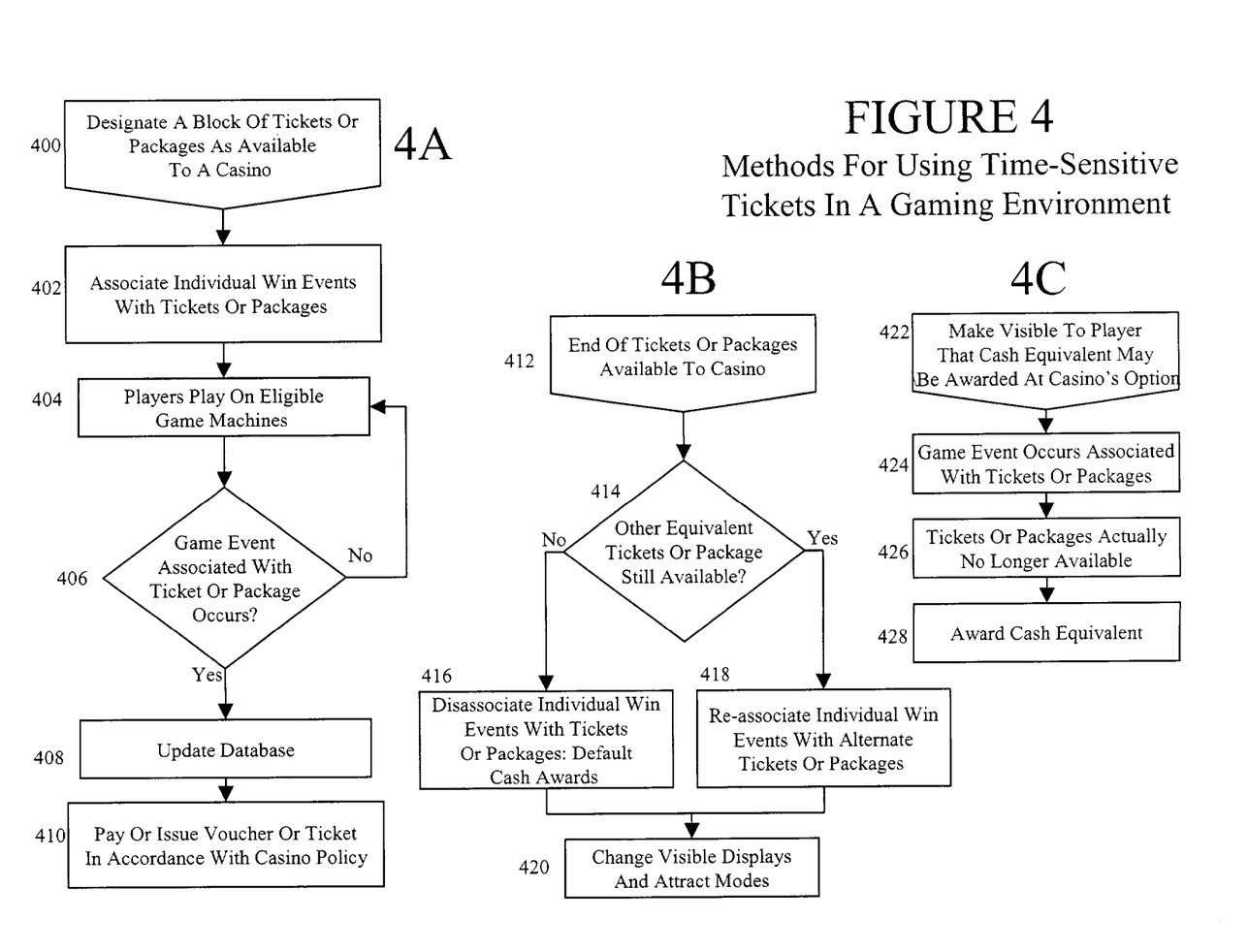
FIG. 4 is a flow diagram showing additional methods of using time-sensitive tickets as awards in a gaming environment according to the present invention.

Referencing FIG. 3, shown is a gaming machine 300 with one or more displays 302 usable with the present invention. Displays 302 are preferably LCD displays, but can be any visual media. The gaming machine 300 has the standard components, including reel display 304, player input or control buttons 306, player input devices 310 (including player's card magnetic stripe card reader, bill acceptor or voucher reader/printer, smart card dock, and/or other player devices), game cabinet base 308, and networking interfaces 312 (the top one, corresponding to connection 314, is an ethernet interface; the bottom two, corresponding to connections 316 and 318, are serial interfaces). Included but not shown are the internal mechanical, electrical, and logical components needed in an average gaming machine.

Also shown is a floor controller 322, typically used for functions including translating serial protocols to general LAN protocols, typically to ethernet-based TCP/IP, as well as keeping various accounting and state information in case of a power hit to the games. Floor controller 322 then communicates with backend system 328 via LAN connection 324.

Shown is an alternate control path for the game's top box containing player visible display(s) 302. One is connecting the top box video output to video controllers (in the gaming machine's top box, controllers and video drive circuitry not shown) run by output sent directly by backend computer 328 over a backbone LAN 320 via connection 314 to the LAN (preferably ethernet) port into the top box. Any means or path can be used as long as display information visible to a player may be updated via electronic communications for high frequency time-sensitive awards (lower cost and often won awards or tickets, expected to be awarded on a daily basis, including more than one per day, rather than a once a week or less frequent basis).

Referring to FIG. 4A, shown is one time-sensitive award method. Starting in box 400, a designated block of preferably specially discounted tickets is made available at a travel agency, sports ticket outlet, or directly from a supplier of such things (i.e., an airline, a sports team, an event promoter, etc.) in an on-line database. "Tickets" is understood to include but is not limited to any type and any price level of time-sensitive purchases such as: travel packages; entertainment packages including but not limited to such traditional packages as weekend get-a-ways; a concert with dinner and transportation; a significant sports event with a weekend or overnight stay and transportation to the location, plus meals; a local event's entrance fee only; and/or anything similar, where one basic component is that the timing is fixed (i.e., the event happens on a specific date: the travel package expires in 2 months and must be used in a fixed time period after that, the concert date, the sports event date, the restaurant reservations date, etc.). Part of allocating the block of tickets will be to establish a value, from a pay-out perspective, that will be assigned to each ticket. Box 400 is left for box 402.

The actions corresponding with box 402 include those needed to associate the value a ticket with a win event. Note that in general, there are two ways to associate tickets with events. One is to individual event occurrences on individual games, which upon occurrence will result in a ticket being awarded to the player of the game. In this case, when a specific symbol sequence occurs, instead awarding a cash prize the ticket associated with this event will be awarded (as an exemplar of such a game machine currently operating in Nevada-style casinos, Sierra Design Group, Inc., of Reno, Nev. has a game that awards jewelry to players upon certain winning events rather than cash—this same type of machine could readily award tickets rather than jewelry). The other is to associate the tickets with progressive or bonus events, where the triggering event may or may not be related to any specific event on an individual machine (e.g., may be a "surprise bonus" or "mystery win" that is awarded upon the occurrence of non-game events or upon the occurrence of a game event on a machine different than the game on which the player being awarded the ticket is playing). Various other specific ways of assigning tickets of specified value to be awarded as prizes to players will come to the mind of a person of ordinary skill in the gaming arts and with the benefit of the present disclosure, and are fully contemplated by the present invention. Each casino will decide for each block of tickets how they want to use the tickets as prizes to reward play.

Details for methods of awarding a ticket physically to the player are not given in detail, but include hand-pays by casino attendants, printing a voucher with the award redemption information on it to the player, and having tickets physically present in compartments in the game machine's top box which are electronically opening upon the occurrence of an award event. A plurality of such methods are readily available at all casinos; the casino will choose which one most suits its particular needs.

Box 402 is left for box 404. The actions associated with this box are those where players commence play on gaming machines having tickets as awards or prizes. Diamond 406 is entered next, where there is a continual test if a game event has occurred that is associated with a ticket. If the game event is not one associated with a ticket, then the "No" exit is taken back to box 404 and the box 404/diamond 406 loop continues. If the game event is one associated with a ticket, then the "Yes" exit is taken to box 408.

The actions corresponding to box 408 are to update the on-line database, showing one of the tickets in the allocated block as sold. Note that it is assumed there is a ticket to be sold—this is because it is expected that if the tickets are no longer available it will be the case that the on-line system will notify the casino, which will in turn disassociate the tickets from any game events. This is discussed further below. The on-line database is updated and box 408 is left for box 410. The actions corresponding to the box 410 are to award the ticket to the player in whatever fashion the casino had previously decided (print voucher or winning ticket to be cashed in, hand pay with casino personnel, issue ticket from a compartment in the game similar to the Sierra Design Group® Raining Diamonds® game, etc.).

Continuing on with 4B, which shows the end events surrounding the unavailability of tickets, the process starts at box 412. The actions corresponding with box 412 include: awarding the last ticket from the allocated block so that when updating the on-line database the remaining ticket count goes to 0; being notified by the owner of the on-line database that the ticket count went to 0; being notified the package or tickets have been cancelled; being notified that the purchase deadline has passed; or, other reasons for the tickets to become unavailable for sale to the casino, therefore unavailable as prizes. In all cases the initiating event is the casino being notified that these tickets are no longer available. Box 412 is left for diamond 414.

The actions corresponding to diamond 414 are to determine if other blocks or tickets at the same value are currently available. If the answer is yes, the "Yes" exit is taken to box 418. The actions corresponding to box 418 are to determine the one or more ticket blocks, currently available, at the same level (pricing level or associated prize level) as the now expired or exhausted ticket block. If there is more than one, then a selection is made on which tickets to offer as awards in place of the recently exhausted ones. In some cases this will be readily apparent; for example, if the game is a sports themed game such as baseball, and the prior tickets were for a baseball related event, then if there is another baseball related event that would be chosen. Any such criteria may be used by the casino, including a random selection. After choosing a next replacement, the newly selection tickets are associated with the win event. Box 418 is left for box 420.

Returning to diamond 414, if there are no more allocated tickets at the same level, then the "No" exit is taken to box 416. The actions corresponding to this box are any needed to disassociate the ticket awards from any game event. The game event (for individual games) will revert to the cash award; for progressive and/or bonus awards, there may be a cash equivalent of that particular event(s), or that prize or award may simply be eliminated (no payout occurs for that previous awarded event). Box 416 is left for box 420.

The actions corresponding to box 420 are those taken to change any existing visual pictures, notices, advertisements, etc., associated with the previous tickets and visible to players. If there is no replacement block of allocated tickets, then the notices will be changed to generic attract mode pictures, etc. If there is a replacement block of tickets, the preferred embodiment is to change all the attract mode and other advertising to the newly available event, travel package, etc. As always, the choice will be the casino's.

Flow diagram 4C illustrates a method for handling the rare but possible event of having a player trigger a ticket issuing event, but when the on-line database is used to transfer ticket ownership to the casino (and thereafter to the player), there are no tickets available. Starting at box 422, players are notified that solely at the casino's option, there may be a cash award given instead of any non-cash award at any time. This will preferably be printed on the artwork of any game which may have individual events associated with tickets, near the "malfunction voids all pays" notice. If the award is from a shared bonus or progressive, the notice should be shown with the bonus announcements or signage, or, if the award is not automatically won upon the occurrence of an event (is given based on non-game events at the casino's discretion) is not needed (the on-line database will be used to purchase a specific ticket just prior to it being awarded; if no ticket is available, the award event will simply be internally cancelled and any potentially involved players will never know of the potential event).

However it is done, there must be a permanent notice to this effect visible to players. Continuing from box 422 to box 424, the action is a game event occurring that is associated with a ticket. Continuing into box 426, the casino's system attempts to purchase an individual ticket, but cannot (for any reason). Box 426 is left for box 428, where the actions taken include those needed to inform the player that the ticket is no longer available (package cancelled, sold out, etc.) and that the casino must use its cash equivalent option. The player is then given the cash equivalent of the ticket that could not be awarded (this is always a known amount, as explained above). This avoids problems in the unlikely, but possible, event that a ticket that has been won cannot be issued for reasons outside the casino's control.

Figure 5:
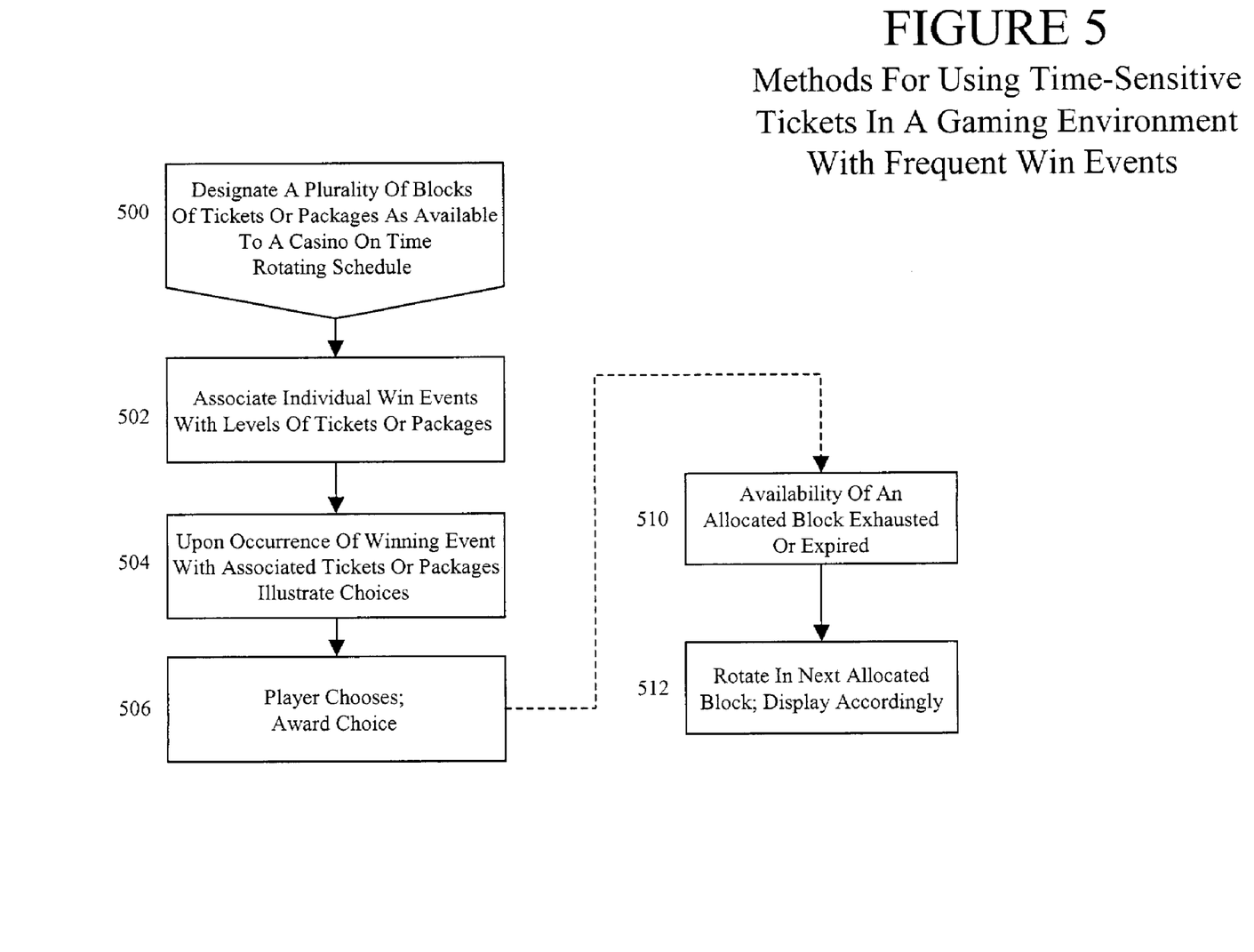
FIG. 5 is another flow diagram showing an additional method of using time-sensitive tickets as awards in a gaming environment according to the present invention.

FIG. 5 illustrates another preferred embodiment of the present invention, where the tickets will be used in high-frequency win events. "High frequency" means a situation where it is minimally expected that a plurality of tickets will be won per week, and it is further within probabilistic expectations that a plurality of tickets may be won per day. In a preferred embodiment, this will be accomplished using regularly occurring events of a given type (regular season baseball games at a local stadium, regularly schedule concert events, etc.). Tickets will be allocated in the 100s rather than in the 10s, and in the preferred embodiment will comprise a rotating set of allocated blocks, overlapping in terms of time deadlines. Thus, if the tickets are for baseball games, then the preferred embodiment would be to allocate blocks of tickets by series (typically 3 or so baseball games against a single visiting opponent), with the agreement covering the entire regular season. Thus, there would be allocated blocks of tickets by 2/3/4-game series, each series being considered one block of tickets. The tickets would be awarded by blocks as the season goes along, with all blocks being considered useable by the casino at the start of the season, conceptually crating a plurality of active, time-overlapped pools or blocks of allocated tickets. Each block would be awarded in time sequence; upon the tickets for a series being sold out or upon ticket time expiration, a new block would become active and would become associated with the game events. Pools would be rotated through in this manner until the end of the season.

Having multiple active pools of allocated tickets is not restricted to the same type of event; the concept is readily usable with any time-overlapped pools of allocated tickets/packages.

Starting at box 500, there will be a set of pools (each pool being an allocated block of tickets) made available to a casino, with a subset of the pools having overlapping times of availability on any given date, with additional pools becoming available as time goes on, replacing expired or exhausted pools. The pools will have an equivalent value or level, usable for associating with the same win events in a game, bonus, or progressive. A set of overlapping pools is selected by the casino. Box 500 is left for box 502, where the value of a ticket (selectable from any of the active selected pools) is associated with a game event, bonus round event, or progressive event (it is expected that this will be used primarily with individual game events and bonus events). Box 502 is left for box 504, which corresponds to the action of a player playing a game on which a triggering event occurs. Upon the occurrence of the triggering event the player is presented with a plurality of choices, preferably using screen-type displays as shown in FIG. 3. Continuing into box 506, the player uses a designating player input device (a physical button or touchscreen position) to make a choice. Upon making a choice, the player is awarded a ticket of his choice.

The line from box 506 to 508 is dotted, indicating a different portion of the process that some casinos may not use. Up to this point in the flow diagram, multiple pools could be open, and they could all have the same expiration date. One significant additive feature was that by having a plurality of open pools, a player could make a choice between tickets upon the occurrence of a single win event. Continuing into box 508, it is now assumed that one pool becomes unusable (exhausted, expires before the other open pools, etc.) That one pool is now de-allocated (is not a choice to be shown to a player upon the occurrence of a winning event), after the casino's backend system is notified by the on-line system. Box 508 is left and box 510 entered. The actions corresponding to box 510 are those associated with selecting at least one available pool to replace the just deactivated pool. Upon the occurrence of a winning event, the player will be shown a selection that now includes the newly associated pool.

Note that the discussion for FIG. 5 involved a plurality of pools; however, the last two boxes represent a process that could work well with single pool choices as well. In such cases, the player would be shown the currently active pool choice only.

The present invention has been partially described using a flow diagram. As will be understood by a person of ordinary skill in the art and with the benefit of the present disclosure, steps described in the flow diagram can vary as to order, content, allocation of resources between steps, times repeated, and similar variations while staying fully within the inventive concepts disclosed herein.

Accordingly, it will be seen that this invention provides a system and method using additional game attract modes based on travel package awards (or other time-sensitive awards), while allowing a casino to offer these types of prizes without incurring upfront costs of the tickets, and further without the risk of having unused tickets when the time for use is passed by. This is enabled using the real-time connection to an agency or provider of the awards (travel packages, sporting events) coupled with the dynamic displays viewable by players. Although the description above contains certain specificity, the described embodiments should not be construed indicating the scope of the invention; the descriptions given are providing an illustration of certain preferred embodiments of the invention.

What is claimed is:

1. A method for creating player excitement using time-sensitive tickets in a gaming environment having game events at least partially determined by random events, the method comprising:

providing on-line access to a ticket database between a casino and a ticket provider;

allocating a block of tickets from said database designated as purchasable by said casino for an event that will occur at a designated future time;

assigning a ticket value level applicable to each ticket in said allocated block of tickets;

associating a gaming event having a same value level as said ticket value level in one of a gaming machine, a bonus game, or, a progressive pool, to said allocated block of tickets;

having said gaming event occur before said designated future time;

reserving a ticket from said allocated block of tickets by said casino;

updating said on-line database; and, awarding said reserved ticket to a player at said casino.

2. The method of claim 1 where said allocated block of tickets are saleable by both said casino and said ticket provider, and any tickets sold to said casino are sold at an additional discounted rate as compared to other ticket resellers as a result.

3. The method of claim 1 where said allocating a block of tickets further comprises allocating a plurality of blocks of tickets.

4. The method of claim 3 further comprising:
enabling a player to make a choice between a plurality of tickets, said plurality of tickets being from said plurality of allocated blocks of tickets.

5. The method of claim 3 further comprising:
designating a first appearance time to be a specified time before the occurrence of an event, for a plurality of events occurring at multiple future times;
associating said first appearance time with said event, for each of said plurality of events occurring at multiple future times;
allocating a block of tickets at the start of each of said first appearance times associated with events; and,
enabling a player to make a choice between a plurality of tickets, said plurality of tickets being selected from allocated blocks of tickets, if said allocated blocks of tickets overlap in time.

6. The method of claim 1 further comprising:
determining an end-time for each allocated block of tickets, where said end-time is a last time tickets from an allocated block of tickets is winnable; and,
de-associating a block of allocated tickets from any gaming event to which said block of tickets had previously been associated upon the passing of said end-time.

7. The method of claim 1 where said gaming event is one of: a bingo event; a keno event; or, a slot machine event.

8. A gaming system usable for creating player excitement in a gaming environment having gaming events determined at least partially by a random event and using time-sensitive tickets, comprising:
means for providing on-line access to a ticket database between a casino and a ticket provider;
means for allocating a block of tickets from said database to said casino usable for an event that will occur at a designated future time;
means for assigning a ticket value level to each ticket in said allocated block of tickets;
means for assigning a gaming event at a same value level as said ticket value level in one of a gaming machine, a bonus game, or, a progressive pool, to said allocated block of tickets;

means for reserving a ticket from said allocated block of tickets on said database by said casino when said gaming event occurs; and,
means for delivering said reserved ticket to a player at said casino.

9. The system of claim 8 where said allocated block of tickets are saleable by both said casino and said ticket provider, and any tickets sold to said casino are sold at an additional discounted price as compared to another ticket resellers' prices as a result.

10. The system of claim 8 where said means for allocating a block of tickets further comprises a means for allocating a plurality of blocks of tickets.

11. The system of claim 10 further comprising:
means for a player to make a choice between a plurality of tickets, said plurality of tickets being from said plurality of allocated blocks of tickets.

12. The system of claim 10 further comprising:
means for establishing a first appearance time at a specified time before the occurrence of an event and associated said first appearance time with said event, for a plurality of events occurring at multiple future times;
means for allocating a block of tickets upon each occurrence of a first appearance time; and,
means for a player to make a choice between a plurality of tickets, said plurality of tickets being selected from allocated blocks of tickets.

13. The system of claim 8 further comprising:
means for detecting an end-time for each allocated block of tickets, where said end-time is a last time tickets from an allocated block of tickets is winnable; and,
means for de-associating a block of allocated tickets from any gaming event to which said block of tickets had previously been associated when said end-time is detected.

14. The method of claim 8 where said gaming events are events from one of: a bingo game; a keno game; or, a slot machine game.

15. A method of providing tickets at a cost that is below normal discount rates to gaming establishments and enabling gaming establishments to use the tickets as prizes, the tickets being time-sensitive, the method comprising:
linking a plurality of games of chance into a bank of games;
funding a ticket purchasing pool associated with said bank of games;
linking said bank of games to an on-line ticket system having a ticket database thereon, said database having tickets usable for an event to occur at a future time;
allocating a block of tickets for reserving by said gaming establishment;
allowing at least one other entity to also reserve tickets from said allocated block of tickets, where said at least one other entity receives a normal discount rate;
using a steeper discount rate for said gaming establishment;
reserving and selling tickets at the normal discount rate through said at least one other entity;
reserving tickets from said allocated block of tickets by said gaming establishment upon the occurrence of a predetermined event;
charging said gaming establishment said steeper discount rate for each ticket reserved;
awarded said reserved ticket to a player at a game machine in said bank of game machines;

paying for said ticket from said ticket purchasing pool; and, continuing to reserve tickets from said allocated block of tickets until said block of tickets becomes one of: sold out; or, out of date.

16. The method of claim 15 where said ticket purchasing pool is funded from one of: a percentage of player's wagers; or, marketing funds.

17. The method of claim 15 where said predetermined event is one of: an event on a gaming machine in said pool of gaming machines; an event determined by a players' use of said gaming establishment; or, an occurrence of a randomly determined event at periodic intervals.

* * * * *

UNITED STATES PATENT AND TRADEMARK OFFICE
CERTIFICATE OF CORRECTION

PATENT NO. : 7,137,889 B1 Page 1 of 1
APPLICATION NO. : 10/391295
DATED : November 21, 2006
INVENTOR(S) : Robert A. Luciano, Jr.

It is certified that error appears in the above-identified patent and that said Letters Patent is hereby corrected as shown below:

TITLE PAGE
In the Abstract
On line 11, delete "a"

Column 5
In line 15, replace "allocable" with --allocatable--

Column 7
In line 26, after "the value" insert --of--

Column 8
In line 45, replace "selection" with --selected--

Column 9
In line 52, replace "crating" with --creating--

Column 11
In line 45, replace "a" with --the--
In line 46, replace "is" with --are--

Column 12
In line 31, replace "a" with --the--
In line 32, replace "is" with --are--

Signed and Sealed this

Twenty-third Day of January, 2007

JON W. DUDAS
*Director of the United States Patent and Trademark Office*